US005781804A

United States Patent [19]

Constable

[11] Patent Number: 5,781,804

[45] Date of Patent: Jul. 14, 1998

[54] SINGLE TOUCH FLASH CHARGER CIRCUIT WITH TIMER CONTROL

[75] Inventor: Douglas W. Constable, Rochester, N.Y.

[73] Assignee: Eastman Kodak Company, Rochester, N.Y.

[21] Appl. No.: 752,700

[22] Filed: Nov. 19, 1996

[51] Int. Cl.[6] .................................................. G03B 15/05

[52] U.S. Cl. ................................ 396/6; 396/203; 396/206

[58] Field of Search ............................... 396/6, 206, 203; 315/241 P

[56] References Cited

U.S. PATENT DOCUMENTS

| | | | |
|---|---|---|---|
| 4,068,150 | 1/1978 | Iwata et al. | 315/241 |
| 4,130,780 | 12/1978 | Ban et al. | 315/241 |

FOREIGN PATENT DOCUMENTS

| | | | |
|---|---|---|---|
| 3-65129 | 6/1991 | Japan | G03B 15/05 |
| 6-318497 | 11/1994 | Japan | H05B 41/32 |
| 96/01034 | 1/1996 | WIPO . | |

*Primary Examiner*—W. B. Perkey

*Attorney, Agent, or Firm*—Francis H. Boos, Jr.

[57] ABSTRACT

A single touch flash capacitor charging circuit particularly useful in low cost cameras incorporating an oscillation timeout circuit to arrest self-sustaining oscillations for conserving battery consumption. The timeout circuit includes a reference voltage integration circuit coupled to the secondary of the oscillation transformer to develop a reference voltage that is independent of battery voltage. A timer charging circuit is coupled to the voltage reference circuit and determines the timeout period. Closing of a start charge switch resets the timer charging circuit to a fixed voltage differential from the integration circuit reference voltage. When the start charge switch is opened, the timer circuit begins charging to the voltage reference. Once initiated, the flash capacitor charger circuit continues charging the flash capacitor for the duration of the timeout period set by the timer circuit. At the end of the timeout period, the timer charging circuit turns on a pair of switching transistors which operate to shunt off the oscillation transistor in the flash capacitor charger circuit. The start switch resets the timer circuit either through the emitter-base coupled transistors or by auxiliary switch contacts which couple the timer circuit directly to the battery terminal. A low voltage LED charge indicator circuit is also coupled to the transformer secondary to indicate full charge of the flash capacitor.

8 Claims, 2 Drawing Sheets

SINGLE TOUCH FLASH CHARGER CIRCUIT WITH TIMER CONTROL

FIELD OF THE INVENTION

The invention relates generally to flash charging circuits for low cost photographic cameras, and in particular to single touch flash charging circuits in which charging oscillation is started by momentary closure of a start switch and the oscillations are sustained after the start switch is opened.

BACKGROUND OF THE INVENTION

Electronic flash devices typically include flash capacitors that are charged from a battery and discharged through a gas-filled flash tube. Energy from the discharging capacitor excites the gas, which illuminates the scene.

Design considerations usually involve a balance between a reasonably long battery life and the desire for rapid and continuous charging of the capacitor. In multiple use cameras this balance frequently is resolved in favor of continuous or automatically recycled charging whenever the flash is in a ready mode. If the battery is drained, there may be some inconvenience, but it is replaceable. In single use cameras, on the other hand, the batteries are generally not accessible by the user for replacement. Elimination of undue battery drain is particularly important, even in the ready mode. One known solution is to require the operator to maintain continuous pressure on a biased switch. Charging is stopped when the switch is released, saving the battery.

An example of a recent approach for balancing the above-mentioned considerations is depicted in Konica Japanese Publication No. 3-65129U. A photographic camera is disclosed with an electronic flash device that has a charging cycle initiated by one switch and arrested by another switch. Momentary depression of the first switch energizes a self-oscillating charging circuit which continues charging after the momentary switch is released. An inductive coupling and capacitive timing circuit are used to activate the second switch and arrest the oscillations several seconds after recharging is completed. A neon ready lamp is coupled across the flash capacitor for visually indicating when the device has sufficient charge for satisfactory operation.

The solution proposed in the above-mentioned publication offers unattended charging and automatic shut-off, but relies on indirect inductive coupling and a capacitive timing circuit. Tolerance variability in such components and circuits is not conducive to reasonably precise yet inexpensive charge control. Temperature changes affect circuit characteristics and degrade performance. Closely controlled operation with a neon ready light also is difficult, since the ready light works directly off the capacitor, while the shutoff control is inductively coupled.

Another example is found in a circuit disclosed commonly assigned PCT International Publication WO 96/01034. In this circuit, a single touch oscillation circuit is used to charge a flash capacitor. When the flash capacitor reaches full charge, a feedback path from a neon ready light circuit drives a switching transistor into conduction which, in turn, shunts the base of an oscillation transistor to ground thereby shutting off the oscillation function. While effective for its oscillation arresting function, it involves the use of relatively costly high voltage components, i.e. a zener diode and a neon ready light to directly sense the flash capacitor voltage for feedback shut off purposes.

There is therefore a need for a low cost self arresting flash charging circuit, particularly of the single touch type, that is suitable for use in low cost cameras such as those referred to as "single use" or recyclable cameras.

SUMMARY OF THE INVENTION

In accordance with the invention, therefore, there is provided a single touch flash charging circuit for charging a flash capacitor that comprises a self-oscillating circuit including an oscillation start switch, a transformer and an oscillation transistor having a base terminal, the self-oscillating circuit being of the type that closure of said start switch initiates self-sustaining oscillations which continue after opening of said start switch. The charging circuit includes an oscillation timeout circuit having a reference voltage integrating circuit and a timer charging circuit. The integrating circuit includes a voltage integration node to which the timer charging circuit is coupled and is responsive to pulses in the transformer secondary winding for generating at the integration node a constant reference voltage which is independent of battery voltage. The charger circuit also includes switching transistor means having an emitter terminal coupled to the base of the oscillation transistor, a collector terminal coupled to the integration node and a base terminal coupled to the timer circuit. The timer charging circuit is operative, upon opening of the start switch after initiation of the oscillations, to charge for a predetermined time to the reference voltage level whereupon the switching transistor means is made operative by the timer charging circuit to render the oscillation transistor non-conductive thereby terminating the oscillations.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
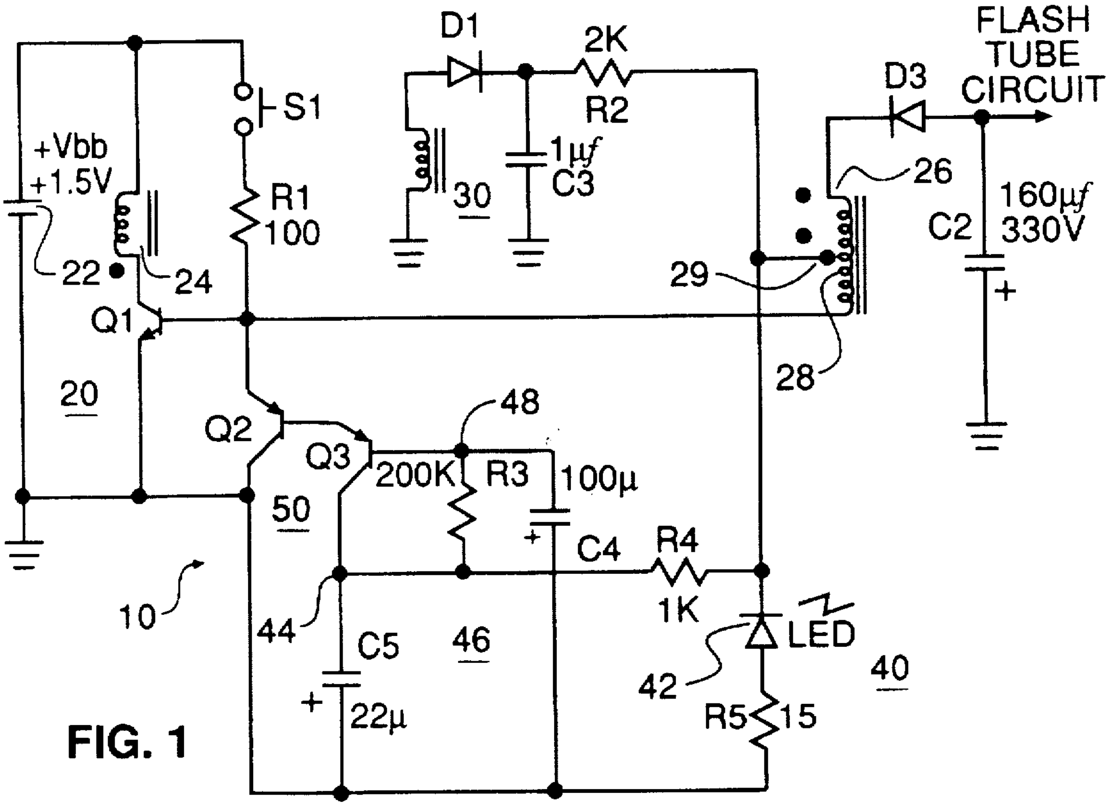
FIG. 1 is a circuit schematic diagram of one preferred embodiment of the flash charging circuit of the present invention.

Referring to FIG. 1, the single touch flash charging circuit 10 illustrated therein comprises a self oscillating circuit 20 including a 1.5 volt battery 22, an oscillation transistor Q1, a transformer having primary and secondary windings 24 and 26. A portion 28 of the secondary winding serves as a tertiary winding providing feedback to the base of oscillation transistor Q1 to maintain self-sustaining oscillations in the oscillation circuit in known manner. Battery 22 is coupled to the collector of transistor Q1 via the primary winding 24 and is coupled to the base of transistor Q1 via a normally open start switch S1 and a low impedance resistor R1. When switch S1 is closed, resistor R1 serves as a strong current source to the base of transistor Q1 to initiate oscillation in the oscillating circuit 20. Stepped-up pulses generated in the secondary winding 26 are rectified by diode D3 and used to charge flash capacitor C2 in known manner. In the illustrated embodiment, the self oscillating circuit 20 includes an optional bias supply circuit 30 comprising a few winding turns inductively coupled to the oscillation transformer to provide low voltage pulses which are rectified by diode D1 and filtered by capacitor C3 to provide a suitable DC bias current to the base of oscillation transistor Q1 for improving the operating efficiency of the oscillating circuit. An advantage of this bias supply circuit is that, since it derives its operating energy from the inductive coupling to the oscillation transformer, it operates only during the flash capacitor charging cycle and thereby minimizes drain on the battery.

A charge indicating circuit 40 includes a light emitting diode (LED) 42 and resistor R5 connected in series from an intermediate tap 29 on the secondary winding 28 to ground. During the charging of flash capacitor C2, its negative charge voltage is increased by current pulses through diode D3. Correspondingly, the magnitude of the negative pulses on the cathode of diode D3 increase as flash capacitor C2 charges and the magnitude of the negative pulses on tap 29 increase in proportion to the magnitude of the negative pulses on the cathode of diode D3. The position of tap 29 is chosen such that the negative pulses at the tap will forward bias and illuminate LED 42 when sufficient negative charge is achieved on flash capacitor C2 to fire the flash illumination tube (not shown). The design principles of indicator circuit 40 are set forth in U.S. Pat. No. 4,068,150, the disclosure of which is incorporated herein by reference.

The time period during which the flash charging circuit 10 oscillates for charging of flash capacitor C2 is determined by an oscillation timeout circuit 46 which comprises a voltage reference integration circuit including resistor R4 and capacitor C5 and a timer charging circuit including resistor R3 and capacitor C4. Integrating circuit R4,C5 is coupled between the secondary winding tap 29 and ground and responds to the negative pulses at tap 29 to develop a negative reference voltage of about −2.0 volts at node 44 when flash capacitor C2 is fully charged. Tap 29 serves as a convenient source of negative pulses for both the LED indicating circuit 42 and the reference voltage integrating circuit R4,C5, although it will be appreciated that these two circuits can be driven from separate taps on the secondary winding 26, if appropriate.

Timer charging circuit R3,C4 is coupled from node 44 of integrating circuit R4,C5 to ground and the component values of the timer charging circuit are selected to provide a desired ON time for the self oscillating circuit that is a balance between providing sufficient flash capacitor charging time to allow an operator to compose and take a picture while at the same time not prolonging the charging time so as to needlessly drain the battery 22. One to two minutes of continuing oscillation by flash charging circuit 10 may be considered adequate for this purpose.

The flash charging circuit 10 also includes switching transistor means 50 comprising a pair of emitter-base coupled transistors Q2 and Q3. The emitter and collector of transistor Q2 are coupled to the base and emitter, respectively, of oscillation transistor Q1. The base of transistor Q3 is coupled to node 48 of timer charging circuit R3,C4 and the collector is coupled to integration node 44 of reference voltage integrating circuit R4,C5. The switching transistor means 50 responds to the timer charging voltage at node 48 to turn off the oscillation transistor Q1 at the end of the selected timeout period.

Considering now the operation of flash capacitor charging circuit 10, the closing of start switch S1 initiates oscillation of the charging circuit 10 by supplying a strong current from battery 22 and low impedance resistor R1 into the base of oscillation transistor Q1. When switch S1 is released, oscillation is sustained with current supplied by feedback winding source 28. Additionally, a DC bias current is supplied to the transistor Q1 base through the secondary winding tap 29 from bias supply circuit 30. The provision of DC bias current to the oscillation transistor base improves the charge recycle time by improving the charger duty cycle. The effect of the bias supply circuit 30 is to increase the transistor Q1 forward base current from that which would be provided by the secondary winding alone. This increases the ON time of each cycle of oscillation. The charger circuit continues operation until it is turned off by the operation of timer circuit 46. As previously noted, charge operation time of 1–2 minutes is considered acceptable although other operating times may be selected.

The operation of timeout circuit 46 and switching transistor means 50 in controlling the operating time of the charging circuit is as follows. Before S1 is pressed, the base of transistor Q3 (node 48) is at ground, or possibly at a slightly negative potential because of residual charge on capacitor C4. When switch S1 is closed to start oscillation, the emitters of transistor Q2 and transistor Q3 are pulled positive with respect to the base of transistor Q3, thereby forward biasing both transistors. Because a strong base current flows via resistor R1 to the base of oscillation transistor Q1, the conduction of transistor Q2 and transistor Q3 is insufficient to cause transistor Q1 to turn off. This sets (i.e. resets) node 48 of the timer charging circuit by causing capacitor C4 to charge up to the battery voltage Vbb minus the two diode drops of the two base-emitter junctions of transistor Q2 and transistor Q3. Typically, this reset level would be about +0.4 volts. When switch S1 is released and the switch contacts are opened, the emitters of transistor Q2 and transistor Q3 become more negative. These transistors then cut off since capacitor C4 maintains the same voltage on transistor Q3 base (node 48) that it charged to when switch S1 was closed.

Simultaneously with starting of oscillation, the negative oscillation pulses at tap 29 are integrated into a negative reference voltage at node 44 by the integrating circuit R4,C5. The reference voltage is about −2 VDC when capacitor C2 is fully charged. When switch S1 is released and transistors Q2 and Q3 cut off, capacitor C4 immediately begins charging toward this negative voltage at node 44 thus initiating the timeout period for maintaining oscillations in the flash capacitor charger circuit 10. The end of the timeout period occurs when the charge on capacitor C4 forward biases Q3 as it approaches the negative reference voltage at node 44. At this time, node 48 is sufficiently negative to forward bias the base-emitter junction of transistor Q3 which in turn will forward bias transistor Q2 turning transistor Q2 ON. Once turned ON, transistor Q2 then shunts off the base of transistor Q1. This occurs by virtue of the fact that feedback winding 28 is a relatively high impedance current source. The current through the emitters of transistors Q2 and Q3 from this high impedance source is sufficient to divert enough feedback drive current from the base of oscillation transistor Q1 to cause it to become non-conductive, thereby turning off the charging circuit. Once the charger oscillation is stopped, the positive bias supply from circuit 30 returns to zero volts and the charger circuit can then be restarted the next time switch S1 is closed.

An advantage of the described circuit is that the start switch S1 can be integrated with the camera shutter button in the form of a well known two stage button in which S1 closes in the partially depressed stage before the shutter is actuated in the fully depressed stage. Closure of switch S1 upon partial depression of the shutter button starts the charger circuit, resetting the timer charging circuit as described above. Partial depression of the shutter button also indicates the charge status of the flash capacitor. If the capacitor is charged, LED 42 immediately lights and remains lit for the charge time out period (e.g. one to two minutes) after the button is released. If the capacitor is not charged, LED 42 lights when the flash becomes charged (less than ten seconds depending on the residual charge state of the flash capacitor and the voltage level of the battery). This provides the benefit of a "one button" camera instead of having a separate shutter button and flash charge button. It also has the advantage of causing the charger circuit to auto-restart after the taking of a flash picture since the charger circuit is restarted each time the shutter button is partially depressed.

Figure 3:
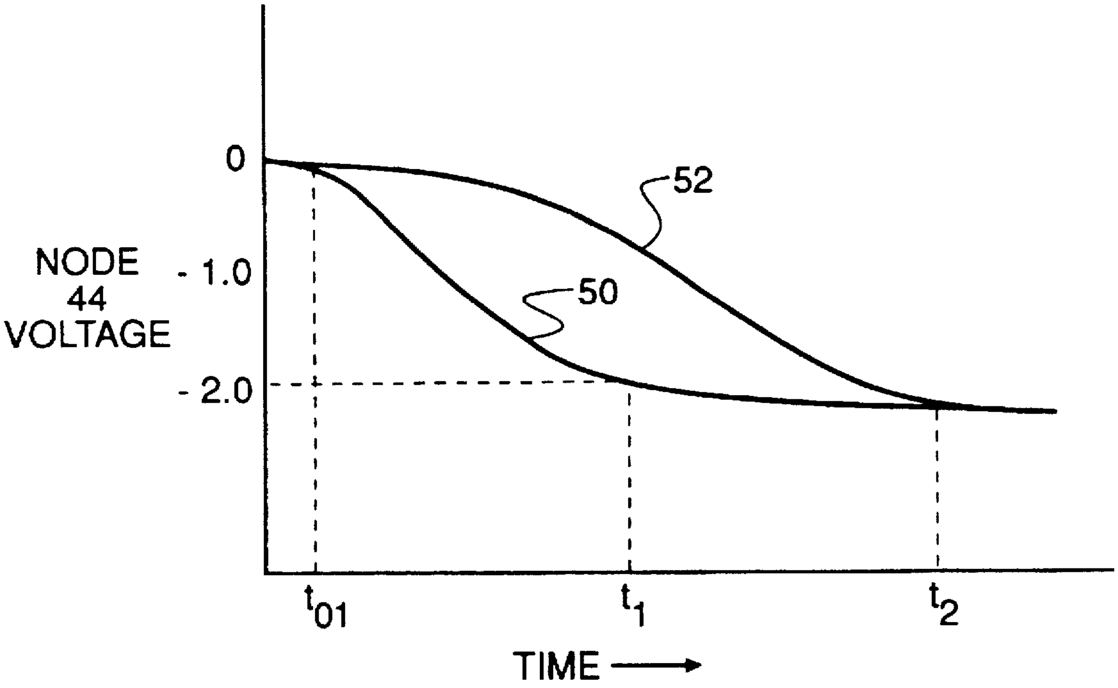
FIG. 3 is a graph of reference voltage curves used in explaining the operation of the circuits of FIGS. 1 and 2.

A further advantage of the circuit is the fact that, by virtue of the connection to tap 29 on the transformer secondary, the reference level at integrator circuit node 44 is repeatably set to a constant level (in the illustrated example: −2.0 volts) when the flash capacitor C2 reaches full charge. Thus the reference level is set by the magnitude of the pulses at tap 29 corresponding to the fully charged condition of flash capacitor C2 and is independent of battery voltage. FIG. 3 illustrates the reference voltage level characteristic at node 44 as a function of time from the beginning of the charging of capacitor C2 at time $t_0$. If the battery condition is fresh, providing a full 1.5 volts, the capacitor C2 charges rapidly and the node 44 reference voltage follows the characteristic curve 50 reaching the −2.0 volt level at time $t_1$. If the battery voltage is low, the charging rate on capacitor C2 is slower and the node 44 reference voltage follows characteristic curve 52 reaching the −2.0 volt level at a later time $t_2$. However, since the node 44 reference voltage is dependent on charge level on capacitor C2 and not on battery condition, the reference level always reaches the constant −2.0 volt level. Moreover, since the timer charging circuit is charging to the reference voltage level at node 44, it charges at a faster or slower rate depending on the voltage integration characteristic curve eventually reaching the −2.0 volt level and assuring that adequate time out is provided before shutting off the oscillations in the charging circuit 20.

Figure 2:
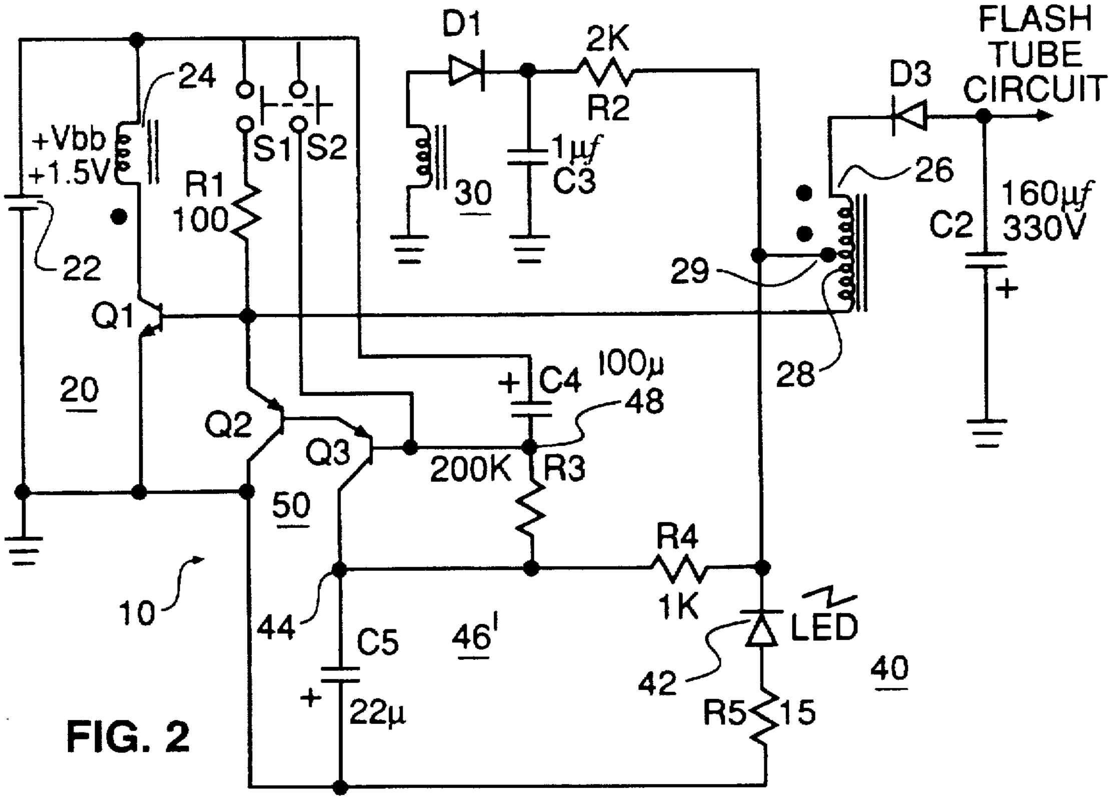
FIG. 2 is a circuit schematic diagram of an alternative preferred embodiment of the flash charging circuit of the invention.

FIG. 2 shows a modified embodiment of a flash capacitor charger circuit according to the invention. It is identical to that of FIG. 1 except for the treatment of the timer charging circuit and the manner in which the timer charging circuit is reset at the start of a flash capacitor charging operation. In the circuit of FIG. 2, capacitor C4 of timer charging circuit 46' is moved so as to be connected from node 48 to the positive terminal of battery 22. Additionally, start switch S1 is ganged with a second, normally open switch S2 with the contacts of switch S2 connected between the positive terminal of battery 22 and the base of transistor Q3 (node 48). In operation, when start switch S1 is closed, switch S2 also closes, immediately discharging capacitor C4 and bringing node 48 to the full battery voltage level, 1.5 volts, since switch S2 effectively bypasses the diode drops of the base emitter junctions of transistor Q2 and transistor Q3. Although the circuit of FIG. 1 has the benefit of a simpler start switch construction, the circuit of FIG. 2 has the benefit of providing a greater voltage drop between node 48 and node 44 than that of FIG. 1 (3.5 volts vs 2.4 volts) thereby allowing for longer possible charger timeout period and also providing for a stronger cutoff action by the emitter-base coupled transistors Q2 and Q3.

The invention has been described with reference to a preferred embodiment. However, it will be appreciated that variations and modifications can be effected by a person of ordinary skill in the art without departing from the scope of the invention.

PARTS LIST

10 flash charging circuit
20 self-oscillating circuit
22 battery
24 primary transformer winding
26 secondary transformer winding
28 tertiary transformer winding
29 secondary winding intermediate tap
30 bias supply circuit
40 charge indicating circuit
42 light emitting diode
44 reference voltage integrating circuit voltage node
46,46' oscillation timeout circuit
48 timer charging circuit voltage node
50,Q2,Q3 switching transistor means
Q1 oscillation transistor
C2 flash capacitor
R3,C4 timer charging circuit
R4,C5 reference voltage integrating circuit

What is claimed is:

1. A single touch flash charging circuit for charging a flash capacitor comprising:

a self-oscillating circuit including a battery having positive and negative terminals, an oscillation start switch, a transformer having primary and secondary windings and an oscillation transistor having a base terminal and an emitter terminal, said self-oscillating circuit being of the type that operates in response to closure of said start switch to initiate self-sustaining oscillations which continue after opening of said start switch;

an oscillation timeout circuit including a reference voltage integrating circuit and a timer charging circuit, the integrating circuit having a voltage integration node, to which the timer charging circuit is coupled, and being responsive to pulses in said transformer secondary winding for generating at said integration node a constant reference voltage independent of battery voltage; and switching transistor means having an emitter terminal coupled to the base of the oscillation transistor, a collector terminal coupled to said voltage integration node and a base terminal coupled to said timer charging circuit;

whereby upon opening of said start switch after initiation of said oscillations, said timer charging circuit charges for a predetermined time to said reference voltage level at said voltage integration node whereupon said switching transistor means is made operative by the timer charging circuit to render said oscillation transistor non-conductive and thereby terminate said oscillations.

2. The flash charging circuit of claim 1 wherein said switching transistor means comprises first and second base-emitter coupled transistors, the first switching transistor having an emitter and collector coupled respectively to the base and emitter terminals of the oscillation transistor, the second switching transistor having a base coupled to said timer circuit and a collector coupled to said voltage integration node.

3. The flash charging circuit of claim 2 wherein said start switch is coupled between the battery positive terminal and the emitter of said first switching transistor and the timer charging circuit includes a charging capacitor coupled between the base of said second switching transistor and the negative terminal of the battery and said start switch, upon closure, is effective to reset initial charge potential of said timer capacitor through said first and second switching transistors.

4. The flash charging circuit of claim 2 wherein said start switch includes first normally open contacts coupled between the battery positive terminal and the base of the oscillation transistor and second normally open contacts coupled between the battery positive terminal and the base of said second switching transistor, and the timer charging circuit includes a charging capacitor coupled between the base of said second switching transistor and the battery positive terminal, whereby said start switch, upon closure, is effective to reset initial charge potential of said timer capacitor directly to the positive battery potential.

5. The flash charging circuit of claim 1 in which said start switch comprises contacts on a camera shutter button operative to start oscillation of said self oscillating circuit upon partial depression of the shutter button.

6. The flash charging circuit of claim 1 further including a bias supply coupled to the base terminal of said oscillation transistor, said bias supply comprising a rectifier circuit inductively coupled to said transformer for generating and applying bias voltage to said oscillation transistor base terminal only during the generation of oscillations in said self-oscillating charging circuit.

7. The flash charging circuit of claim 1 further including a light emitting diode indicator circuit coupled to said transformer secondary winding and being responsive to pulses in said secondary winding to indicate when said flash capacitor reaches a charge level sufficient to fire a flash illumination device.

8. The flash charging circuit of claim 7 wherein said reference voltage integrating circuit and said light emitting diode indicating circuit are coupled to a common tap on the secondary winding of said transformer.

* * * * *